United States Patent
Raghunath et al.

(10) Patent No.: US 6,201,576 B1
(45) Date of Patent: Mar. 13, 2001

(54) APPARATUS AND METHOD FOR DETECTING AN NTSC SIGNAL IN AN HDTV TRANSMISSION SIGNAL

(75) Inventors: Kalavai J. Raghunath, Chatham, NJ (US); Marta M. Rambaud, Allentown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/105,783

(22) Filed: Jun. 26, 1998

(51) Int. Cl.[7] .................................................. H04N 7/00
(52) U.S. Cl. ............................ 348/558; 348/21; 348/554; 348/555; 348/556; 348/607
(58) Field of Search .............................. 348/21, 558, 535, 348/554, 555, 556, 607, 618, 622, 665, 667, 454, 92, 130, 142; 375/346, 350, 285; 455/63, 296, 306; 382/143, 160; 355/101, 106, 107; H04N 7/00

(56) References Cited

U.S. PATENT DOCUMENTS

| | | | |
|---|---|---|---|
| 5,146,510 * | 9/1992 | Cox | 348/92 |
| 5,353,356 * | 10/1994 | Waugh | 348/92 |
| 5,453,797 * | 9/1995 | Nicolas | 348/607 |
| 5,546,132 * | 8/1996 | Kim | 348/607 |
| 5,594,496 | 1/1997 | Nielsen et al. . | |
| 5,793,417 * | 8/1998 | Lee | 348/21 |
| 5,798,803 * | 8/1998 | Limberg | 348/726 |
| 5,821,988 * | 10/1998 | Citta | 348/21 |
| 5,886,748 * | 3/1999 | Lee | 348/21 |

* cited by examiner

*Primary Examiner*—Matthew Luu
*Assistant Examiner*—Wesner Sajous
(74) *Attorney, Agent, or Firm*—Ian M. Hughes; Steve Mendelsohn

(57) ABSTRACT

A system detects the presence of NTSC co-channel interference and enables NTSC comb-filtering when the NTSC signal is detected. The system comb-filters the baseband signal to generate a filtered baseband signal, and accumulates the noise power of the baseband and filtered baseband signals. The noise power of the baseband and filtered baseband signals is compared by forming a difference between the two noise powers, and the system detects the NTSC signal when the difference exceeds a threshold T. The threshold T is related to a product of a signal power of the baseband signal and a minimum carrier to noise ratio for the ATSC system.

10 Claims, 3 Drawing Sheets

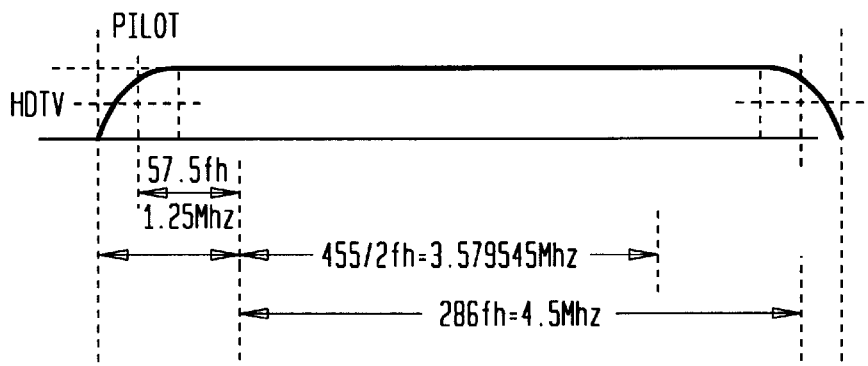
FIG. 2A
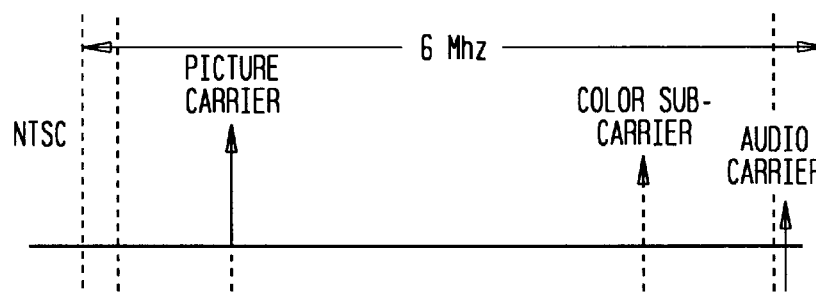
FIG. 2B
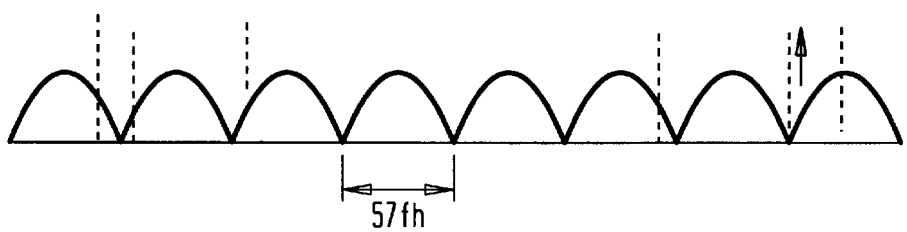
FIG. 2C
FIG. 3
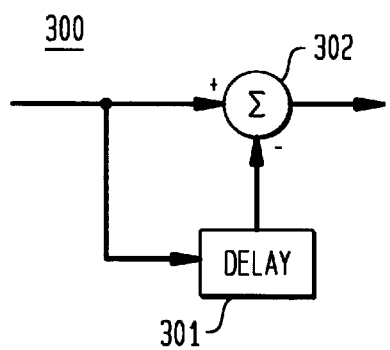

though a comb filter through
APPARATUS AND METHOD FOR DETECTING AN NTSC SIGNAL IN AN HDTV TRANSMISSION SIGNAL

BACKGROUND OF THE INVENTION

1. Field of the Invention

The present invention relates to digitally encoded television transmission systems, and, more particularly, to systems detecting NTSC signals.

2. Description of the Related Art

In the United States, the Advanced Television Systems Committee (ATSC) has proposed a digital television standard for High Definition Television (HDTV) transmission systems. A typical transmitter 100 and receiver 120 of an ATSC transmission system is shown in FIG. 1. The transmitter 100 comprises a video encoder 102 for compressing digital video signals, an encoder & trellis coder 104 for Reed-Solomon coding and trellis coding the signal from video encoder, a precoder 106 for preceding the signal output from encoder & trellis coder 104. Precoding by precoder 106 combines selected symbols of the data stream in a manner that is reversed by an NTSC filter in the receiver 120, thereby canceling NTSC interference as described subsequently. The transmitter 100 also comprises a modulator & SAW filter 108 for forming the signal output from precoder 106 into a form of vestigial side band within 6 MHz, and a radio frequency (RF) transmitter 110 for transmitting the signal from modulator & SAW filter 108 through an RF channel 112.

The receiver 120 comprises a radio frequency (RF) tuner 121 including an intermediate frequency (IF) surface acoustic wave (SAW) filter for selecting a RF channel and providing an IF signal. The IF signal is provided to a demodulator 122 to provide a baseband signal, known as an I-channel signal, and timing recovery circuit 123 recovers data clock, synchronization and timing clock signals from the I-channel signal containing composite symbols for data and timing. The demodulator 122 also may include a synchronous detector and analog-to digital converter (not shown) which provides the I-channel signal as digital samples. An NTSC detector and rejection filter 124, which may be a comb-filter and controller, detects and cancels NTSC co-channel interference in the baseband I-channel signal. A channel equalizer 125 compensates for distortion of the I-channel signal by the RF channel 110 and distortion of the comb-filter, if used, of NTSC detection and rejection filter 124. The I-channel data symbols of the compensated I-channel signal are then applied to a bit de-interleaver (not shown) and error correction and trellis decoding circuitry 126 which performs Reed-Solomon decoding and trellis decoding of the I-channel data symbols to form a decoded bit stream. The decoded bit stream from the error correction and trellis decoding circuitry 126 is then reformatted to a digital data stream by deformatter 128. Deformatter 128 reformats the decoded bit stream since the original digital data stream of an encoder is formatted so as to appear as a random bit stream. The reformatted digital data stream is then decoded by video decoder 130 to provide video signals.

NTSC interference rejection is based on the frequency location of the NTSC co-channel interfering components with respect to transmitted HDTV signals, which relationships are illustrated in FIGS. 2A–2C. FIG. 2A illustrates a RF spectrum of a HDTV signal as transmitted. FIG. 2B illustrates a RF spectrum of an NTSC signal that may cause co-channel interference. FIG. 2C illustrates frequency characteristics of a comb filter as typically used to remove NTCS co-channel interference.

As shown in FIG. 2B, the NTSC signal includes picture carrier, color sub-carrier and audio carrier signals. The comb filter frequency characteristics have null points spaced 896.85 kHz apart which null points are around the frequencies of the picture carrier, color sub-carrier and audio carrier signals. Passing the NTSC signal through a comb filter having such characteristics removes these carrier signals. FIG. 3 is a block diagram of a conventional NTSC comb filter 300. As shown in FIG. 3, the filter 300 may be a single tap, feed forward filter and comprises a delay 301 and subtractor 302. Delay 301 provides a delayed I-channel signal, to subtractor 302, and delay 301 typically delays the I-channel symbols by 12 symbols. Since the comb-filter forms a difference of a symbol and a delayed symbol, the precoder 106 of the transmitter anticipates the comb-filtering and adjusts each symbol accordingly.

The conventional NTSC comb-filter 300 as shown in FIG. 3, while providing rejection of steady state signals at null frequencies has a finite response of, for example, 12 symbols. In addition, while the comb filter reduces NTSC co-channel interference, the data is also modified. As a result of the single tap filter forming a difference of two full gain paths, the comb filter decreases signal-to-noise ratio, degrading white noise performance by 3 dB. Consequently, the ATSC transmission system only comb-filters when necessary. Therefore, an ATSC receiver 120 includes an NTSC detector that only enables NTSC filtering and equalizes the baseband signal when the presence of the NTSC signal is detected.

These NTSC detectors of the prior art typically monitor the signal energies of the un-filtered and filtered baseband signals, and only enable the NTSC comb filter when a SNR drop of greater than 3dB occurs. When an NTSC signal is not present in the baseband signal, filtering doubles the noise power, or reduces SNR by 3 dB, in the filtered signal. A minimum energy detector, therefore, may be used to compare interference noise power, $u^2$, of the baseband signal with the interference noise power, $f^2$, of the filtered baseband signal. If $u^2$ is greater than $f^2/2$, then the NTSC signal is present and filtering is enabled.

Since the I-channel signal includes both a data component (data symbols) and timing component (data field sync signal), an NTSC detector of the NTSC detection and rejection filter 104 of FIG. 1 typically measures a signal-to-interference plus channel noise ratio of the data field sync signal path. This measurement is typically performed by creating and comparing two error signals. The first error signal is created by comparing the received signal with a stored reference of the data field sync signal, and the second error signal is created by comparing the comb-filtered data field sync signal with a comb-filtered version of the data field reference signal. Consequently, the NTSC detector includes a second NTSC filter which comb filters the extracted data field sync signal.

SUMMARY OF THE INVENTION

The present invention relates to an apparatus and method of detecting an NTSC signal in a baseband signal. First, the baseband signal is comb-filtered to generate a filtered baseband signal. Then, an expected value related to the noise power of the baseband signal and an expected value related to the noise power of the filtered baseband signal are generated. A difference is formed between the expected values of the baseband and filtered baseband signals; and the NTSC signal is detected when the difference exceeds a threshold T. Threshold T is related to a product of a signal power of the baseband signal and a minimum carrier to noise ratio.

BRIEF DESCRIPTION OF THE DRAWINGS

Other aspects, features, and advantages of the present invention will become more fully apparent from the following detailed description, the appended claims, and the accompanying drawings in which:

FIG. 2A illustrates a RF spectrum of a HDTV signal as transmitted;

FIG. 2B illustrates a RF spectrum of an NTSC signal that may cause co-channel interference;

FIG. 2C illustrates frequency characteristics of a comb filter as typically used to remove NTCS co-channel interference;

FIG. 3 is a block diagram of a conventional NTSC comb filter; and

DETAILED DESCRIPTION

In accordance with the present invention, an NTSC signal is detected in a baseband signal by comb-filtering the baseband signal to generate a filtered baseband signal, accumulating the noise power of the baseband and filtered baseband signals, forming a difference between the noise powers of the baseband and filtered baseband signals; and detecting the NTSC signal when the difference exceeds a threshold T, the threshold T related to a product of a signal power of the baseband signal and a minimum carrier to noise ratio for the ATSC system.

Figure 1:
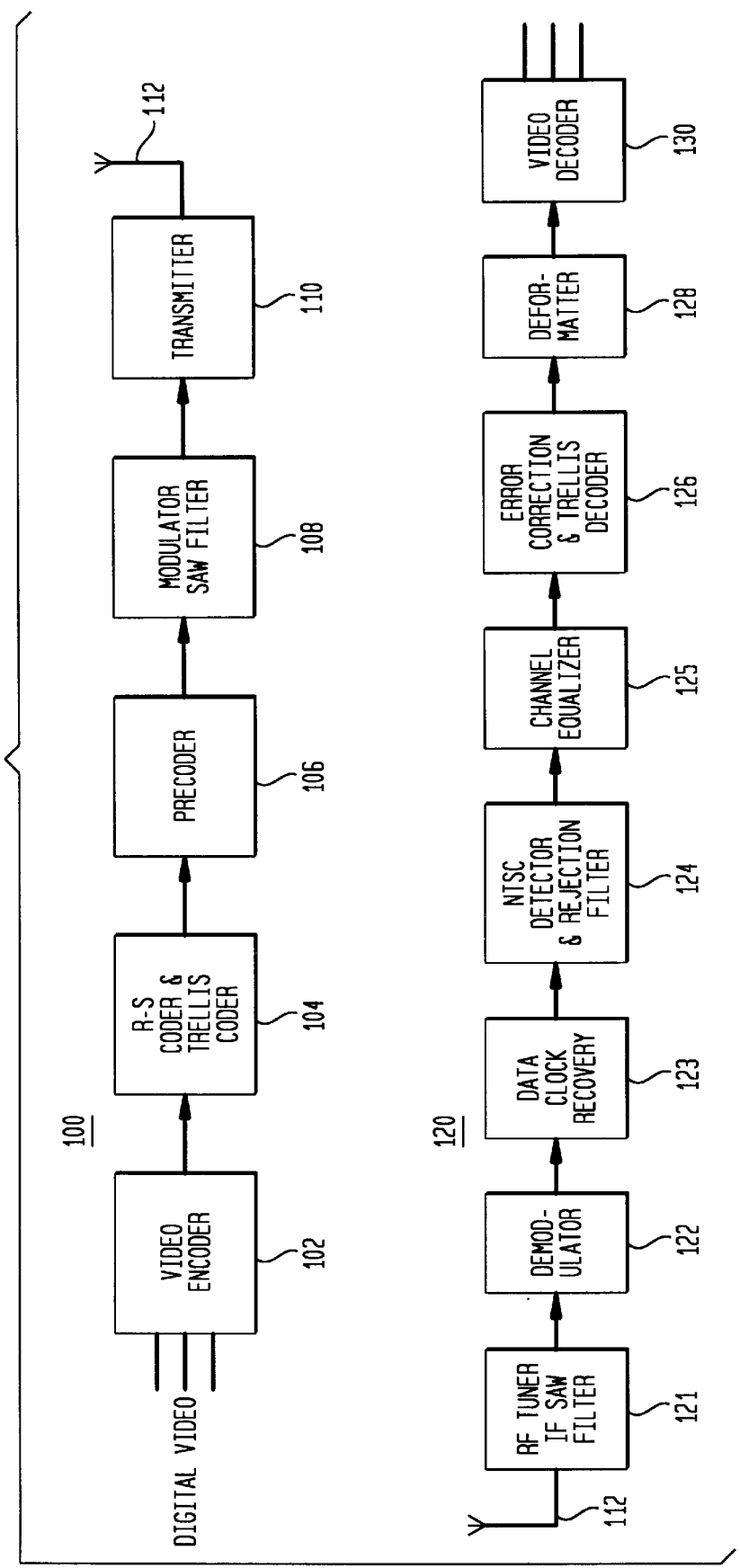
FIG. 1 shows a block diagram of a typical transmitter and receiver of an ATSC transmission system.
Figure 4:
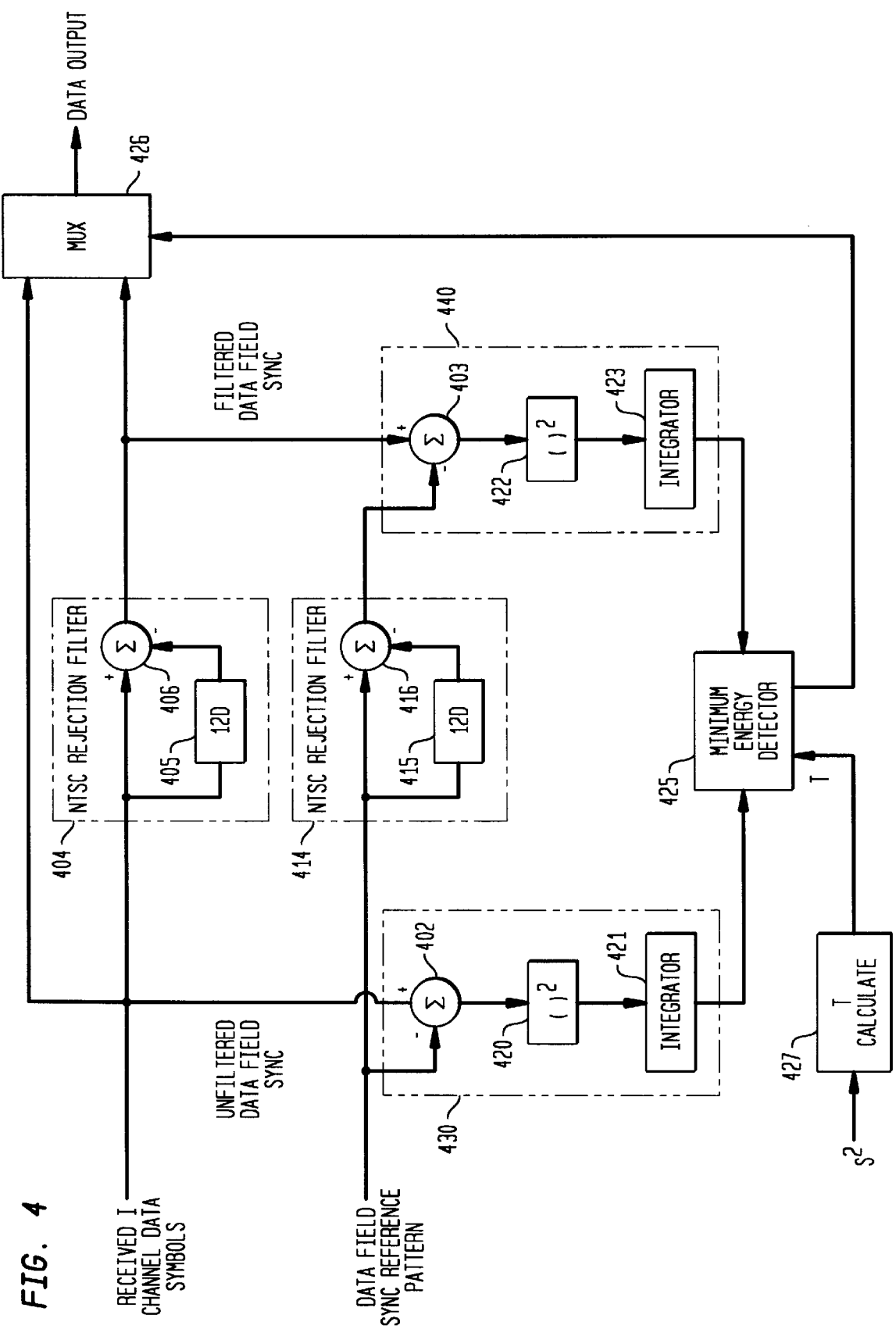
FIG. 4 is a block diagram of an NTSC comb filter and NTSC signal detector in accordance with an exemplary embodiment of the present invention as employed by an ATSC system as shown in FIG. 1.

FIG. 4 is a block diagram of an NTSC comb filter and an interference detector in accordance with the present invention as may be employed in a NTSC detection and rejection filter 104 of FIG. 1 As shown in FIG. 4, the NTSC comb filter and interference detector 400 in accordance with the present invention comprises an NTSC filter 404 made up of a delay 405 and a subtractor 406 for removing an NTSC interference component from the received I-channel signal, and an NTSC filter 414 made up of a delay 415 and subtractor 416 for removing an NTSC component from a data field sync reference pattern.

The detector 400 also comprises first and second signal noise power accumulators 430 and 440. The first signal noise power accumulator 430 comprises subtractor 402 for obtaining the difference between a data field sync signal of a received I-channel signal and a reference pattern data field sync, a squaring circuit 420 for squaring an absolute value of the signal output from subtractor 402, and an integrator 421 for integrating the signal from squaring circuit 420 for a predetermined time to form a first error signal $u^2$.

The second signal noise power accumulator 440 comprises subtractor 403 for obtaining the difference between the comb-filtered data field sync signal of the I-channel from NTSC filter 404 and the comb-filtered reference data field sync signal from NTSC filter 414, a squaring circuit 422 for providing a squared, absolute value of the signal from subtractor 403, and an integrator 423 for integrating the signal from squaring circuit 422 for a predetermined time to form a second error signal $f^2$.

The detector 400 further comprises a minimum energy detector 425 for comparing the signals $u^2$ and $f^2$ from integrators 421 and 423, determines the lowest noise-energy signal, and forms a control signal for controlling multiplexer 426 to select one of the signal passing through NTSC filter 404 and the received I-channel signal. The minimum energy detector 425 selects a lowest noise-energy signal between the two signals based upon equation (1):

$$T < u^2 - f^2/2 \qquad (1)$$

where T is a threshold value and determined as described subsequently. As shown in FIG. 4, the threshold value T may be provided by a T calculation process 427 base upon a measured signal power $s^2$.

If the signal $u^2$ from integrator 421 meets the conditions of lower noise-energy, minimum energy detector 425 determines that there is no NTSC co-channel interference components to the received I-channel signal, and so provides the control signal so that multiplexer 426 selects the received and unfiltered I-channel signal. If the signal $f^2$ from integrator 423 has lower noise-energy, minimum energy detector 425 determines that NTSC co-channel interference components are present and provides the control signal so that multiplexer 426 selects the filtered I-channel signal from NTSC filter 404.

For the detector 400 as shown in FIG. 4, the unfiltered and filtered noise power in the data field sync signal is accumulated as $u^2$ and $f^2$, respectively. The squaring circuits 420 and 422 and integrators 421 and 423 are desirably enabled during a period when data field sync signal symbols are present. A data field sync reference pattern is present in the receiver itself, and timing information is recovered from the data clock recovery portion 123 of the receiver of FIG. 1. Out of the received I-channel signal, the NTSC component of the data field sync signal, if present, is canceled through NTSC filter 404. As is known in the art, an NTSC filter also distorts the data field sync signal to some extent. Consequently, the signal of the data field sync reference pattern is also passed through an NTSC filter 414. Consequently, minimum energy detector 425 compares noise power of the data field sync signal and data field sync reference pattern passing NTSC filters 404 and 414, respectively, with the data field sync signal and data field sync reference pattern of the I-channel signal, thereby outputting a control signal for controlling multiplexer 426 according to the comparison result.

The process for determining the threshold value T of equation (1) is now described. The I-channel signal, i(t), having the data field sync signal components removed may be represented as in equation (2a), and the filtered I-channel signal, i'(t), having the data field sync signal components removed may be represented as in equation (2b):

$$i(t) = n_i(t) + n(t) \quad NTSC \text{ interference; and} \qquad (2a)$$
$$i(t) = n(t) \qquad \text{No } NTSC \text{ interference}$$

$$i'(t) = 2n(t) \qquad (2b)$$

In equations (2a) and (2b), $n_i(t)$ is the NTSC interference noise, n(t) is the channel noise added from the communication channel and 2n(t) is the doubled channel noise by comb-filtering. Squaring i(t) and taking the expected value, then the noise power of the unfiltered I-channel signal, $u^2$, and the noise power of the filtered I-channel signal, $f^2$, is given in equations (3a) and (3b), respectively:

$$u^2 = N^2 + n^2 \qquad (3a)$$
$$f^2 = 2n^2 \qquad (3b)$$

where $N^2$ is the noise power of the NTSC interference noise, and $n^2$ is the channel noise power.

Rearranging equations 3a and 3b gives $N^2$ as in equation (4):

$$N^2 = u^2 - f^2/2 \quad (4)$$

However, if NTSC noise is present, then the signal to noise ratio of the unfiltered signal must be less than the signal to noise ratio of the filtered signal, or equation (3a) is greater than equation (3b), which yields equation (5):

$$n^2 < N^2 \quad (5)$$

In accordance with the present invention, the threshold level, T, of equation (1) is calculated employing the a-priori information that the carrier-to-noise ratio (C/N) threshold for the ATSC system is a predetermined level. The C/N threshold expressed as $10^Y$, given as $C/N = s^2/n_{max}^2$ where $n_{max}^2$ is the maximum channel noise-power, and does not include noise from potential NTSC co-channel interference since NTSC rejection filtering at the filter is assumed. The C/N threshold for the ATSC system may be, for example, 14.9 dB for terrestrial mode or 28.3 dB for cable mode. Since $n_{max}^2$ must desirably be greater than $n^2$ for the ATSC system, equation (5) results:

$$n^2 < s^2 10^{-y} \quad (6)$$

Substituting equations (4) and (5) into equation (6) yields an equation (7) giving the threshold level T:

$$T = s^2 10^{-y} \leq u^2 - f^2/2 \quad (7)$$

In accordance with the present invention, the threshold level T for the minimum energy detector 425 of FIG. 4 compares the signals from integrators 421 and 423 with $s^2 10^{-y}$, and the values for $s^2$ and $10^{-y}$ are known to the receiver 120 (FIG. 1). As described previously, $10^{-y}$ is known from the ATSC C/N requirement, and $s^2$ is determined in the receiver 120. For example, some demodulator circuits for demodulator 122 may have a variable gain amplifier at a front end of receiver 120 which sets signal power, letting noise power, $n^2$, vary as a function of gain for the receiver 120. In this case, $s^2$ is a fixed value, and so T is a fixed value. For an alternate case, the signal to noise ratio varies, but the demodulator may measure signal power $s^2$. In this case, $s^2$ is a variable value, and so T is a variable value, and minimum energy detector 425 may adaptively vary the threshold value T during each comparison of noise powers $u^2$ and $f^2$ from integrators 421 and 423.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for detecting an NTSC signal in a baseband signal comprising:

at least one comb-filter, a portion of the baseband signal applied to the comb-filter to generate a filtered baseband signal portion;

a first noise power accumulator for accumulating a noise power of the baseband signal portion;

a second noise power accumulator for accumulating a noise power of the filtered baseband signal portion;

a difference generator which forms a difference between the noise powers of the baseband signal and filtered baseband signal portions; and a comparator for detecting the NTSC signal when the difference exceeds a threshold T, wherein the threshold T during detection is related to a product of a measured signal power of the baseband signal and an inverted minimum carrier to noise ratio of the baseband signal.

2. The apparatus as recited in claim 1, wherein each of the first and second noise power accumulators comprise a squaring circuit for squaring the baseband or filtered baseband signal portion, and an integrator for integrating the squared signal from the corresponding squaring circuit to provide the accumulated noise power.

3. The apparatus as recited in claim 2, wherein the baseband signal includes a data field sync signal and the apparatus includes at least two comb filters, the first comb-filter filtering the portion of the baseband signal corresponding to the data field sync signal and the second comb-filter filtering a data field sync reference pattern, the apparatus further comprising:

first and second subtractors, the first subtractor forming a difference of the data field sync signal and the data field sync reference pattern, the difference provided to the first noise power accumulator, and the second subtractor forming a difference of the filtered data field sync signal and the filtered data field sync reference pattern, the difference provided to the second noise power accumulator.

4. The apparatus as recited in claim 3, wherein each comb-filter comprises a subtractor and a delay, the delay providing a delayed the baseband signal, and the subtractor forming a difference of the baseband and delayed baseband signals to provide the filtered baseband signal.

5. The apparatus as recited in claim 4, wherein the apparatus is included in a video receiver having a mux, the baseband signal is an encoded video signal having a data signal and the data field sync signal, the first comb-filter further filters the data signal, and the comparator provides a control signal to the mux to select the filtered data signal and filtered data field sync signal when the NTSC signal is detected and to select the baseband signal when the NTSC signal is not detected.

6. A method of detecting an NTSC signal in a baseband signal comprising the steps of:

a) comb-filtering a portion of the baseband signal to generate a filtered baseband signal;

b) generating an expected value related to a noise power of the baseband signal portion;

c) generating an expected value related to the noise power of the filtered baseband signal portion;

d) forming a difference between the expected values of the baseband signal and the filtered baseband signal portions; and e) detecting the NTSC signal when the difference exceeds a threshold T, wherein T during detection is related to a product of a measured signal power of the baseband signal and an inverted minimum carrier to noise ratio of the baseband signal.

7. The method of detecting an NTSC signal as recited in claim 6, wherein the baseband signal includes a data field sync signal and the comb-filtering step a) further includes the steps of:

a1A) comb-filtering the portion of the baseband signal corresponding to the data field sync signal;

a1B) comb-filtering a data field sync reference pattern a1C) removing the data field sync signal from the portion of the baseband signal based on the data field sync reference pattern; and a1C) removing the filtered data field sync signal from the filtered portion of the baseband signal based on the filtered data field sync reference pattern.

8. The method of detecting an NTSC signal as recited in claim 7, wherein the generating step b) generates the expected value related to the noise power of the portion of baseband signal corresponding to the data field sync signal and the generating step c) generates the expected value related to the noise power of the filtered portion of baseband signal corresponding to the filtered data field sync signal.

9. The method of detecting an NTSC signal as recited in claim 8, wherein the baseband signal having a data signal and the data field sync signal is an encoded video signal, the comb-filtering step a) further comprises step a2) of comb-filtering a remaining portion of the baseband signal corresponding to the data signal, and the method further comprises the step of providing the filtered baseband signal when the NTSC signal is detected by the detecting step e) and providing the baseband signal when the NTSC signal is not detected by the detecting step e).

10. An apparatus for detecting an NTSC signal in a baseband signal comprising:

comb-filtering means for comb-filtering a portion of the baseband signal to generate a filtered baseband signal portion;

first accumulating means for accumulating a noise power of the baseband signal portion;

second accumulating means for accumulating a noise power of the filtered baseband signal portion;

difference means for forming a difference between the noise powers of the baseband and filtered baseband signal portions; and comparing means for comparing the difference with a threshold T, the NTSC signal detected when the difference exceeds the threshold T, wherein T during detection is related to a product of a measured signal power of the baseband signal and an inverted minimum carrier to noise ratio.

* * * * *